US010875171B2

(12) United States Patent
Miyawaki (10) Patent No.: US 10,875,171 B2
(45) Date of Patent: Dec. 29, 2020

(54) FOLDABLE SAW

(71) Applicant: U.M. KOGYO INC., Hyogo (JP)

(72) Inventor: Shozo Miyawaki, Hyogo (JP)

(73) Assignee: U.M. KOGYO INC., Hyogo (JP)

( * ) Notice: Subject to any disclaimer, the term of this patent is extended or adjusted under 35 U.S.C. 154(b) by 0 days.

(21) Appl. No.: 16/468,120

(22) PCT Filed: Jul. 18, 2017

(86) PCT No.: PCT/JP2017/025947
§ 371 (c)(1),
(2) Date: Jun. 10, 2019

(87) PCT Pub. No.: WO2019/016860
PCT Pub. Date: Jan. 24, 2019

(65) Prior Publication Data
US 2020/0130167 A1  Apr. 30, 2020

(51) Int. Cl.
| B25G 3/38 | (2006.01) |
| B23D 51/01 | (2006.01) |
| B23D 49/10 | (2006.01) |
| B23D 51/03 | (2006.01) |
| B26B 1/04 | (2006.01) |

(52) U.S. Cl.
CPC .............. B25G 3/38 (2013.01); B23D 49/10 (2013.01); B23D 51/01 (2013.01); B23D 51/03 (2013.01); B26B 1/042 (2013.01); B26B 1/044 (2013.01)

(58) Field of Classification Search
CPC .......... B25G 3/38; B23D 49/10; B23D 49/00; B26B 1/044; B26B 1/042; B26B 1/06; B26B 11/00; B67B 7/30; Y10T 403/60–608; Y10T 403/59; Y10T 403/595; Y10T 403/599; B25F 1/04
USPC ........ 30/153–161, 329–331; 7/156, 167, 118
See application file for complete search history.

(56) References Cited

U.S. PATENT DOCUMENTS

| 4,040,181 A | * | 8/1977 | Johnson | .................. B26B 1/042 30/161 |
| 5,692,304 A | * | 12/1997 | Campbell | ................. B26B 1/04 30/155 |
| 5,765,247 A | * | 6/1998 | Seber | ...................... B25F 1/003 30/161 |
| 6,145,202 A | * | 11/2000 | Onion | ..................... B26B 1/046 30/160 |

(Continued)

FOREIGN PATENT DOCUMENTS

| JP | H09-109104 A | 4/1997 |
| JP | 2008-207289 A | 9/2008 |
| WO | WO-2017194519 A1 * | 11/2017 ............. B26B 1/042 |

*Primary Examiner* — Stephen Choi
*Assistant Examiner* — Sina A. Shayan
(74) *Attorney, Agent, or Firm* — Bacon & Thomas, PLLC (57) ABSTRACT

A foldable saw includes, on a saw handle body, a latch body made of spring wire and including a coil section, a stop pin section, a latch section, and an operation section. The saw handle body includes at least a seating recess, a pin hole, and a receiving groove. The latch body is configured, in the state of being attached to the saw handle body, such that the latch section located in front of the coil section enters into the receiving groove by spring bias, and that the latch section retreats against the spring bias in response to an operation of the operation section located in the rear of the coil section.

20 Claims, 6 Drawing Sheets

(56) References Cited

U.S. PATENT DOCUMENTS 7,437,822 B2 * 10/2008 Flagg ................... B26B 1/044
                                                    30/160
8,161,653 B2 *  4/2012 Nenadic ................ B26B 1/04
                                                    30/161

* cited by examiner

FOLDABLE SAW

TECHNICAL FIELD

The present invention relates to a foldable saw having a foldable and retractable saw blade body.

BACKGROUND ART

In recent years, foldable saws having a saw blade body that is foldable and retractable have been used because of their convenience at and after use.

Such a conventional foldable saw generally has a saw blade body pivotally supported in a freely foldable manner by a back metal body, provided at a saw handle body, via a tie bolt and nut. The back plate body is generally provided with a latch body which can be latched to a latch groove provided at the saw blade body, and the latch body is typically spring-biased via a spring member to the state of being received in the latch groove.

A conventional technique for such a conventional foldable saw is disclosed in the following Patent Literature (PTL) 1.

CITATION LIST

Patent Literature

PTL 1: Japanese Patent Application Laid-Open No. 2008-207289

SUMMARY OF INVENTION

Technical Problem

PTL 1 above discloses an invention of a blade-replaceable saw which includes a saw handle body (1), a saw plate body (3), a back metal body (2), and a ratchet portion (9). The ratchet portion (9) is attached to the back metal body (2), and works together with a ratchet mechanism to basically play a role as a latch mechanism of latching and securing the saw plate body (3) in its use position.

The ratchet portion (9) includes an engagement piece (9g) and an operation piece (9b) which are formed by punching, cutting, or bending a metal plate as appropriate. An operation portion (9f) as another component is attached to the operation piece (9b) together with a spring member (9h) which is yet another component, and the resultant operation piece (9b) is pivotally supported by the back metal body (2) via a pin (9c) which is yet another component.

As such, the latch mechanism using the ratchet portion (9) as disclosed in PTL 1 requires complicated, multiple-step processing, and also requires a large number of components, hindering cost savings. The troublesome assembly also hinders promotion of the efficiency of the production process.

The present invention has been made to solve the conventional problems as described above, with an object to provide a foldable saw in which a latch mechanism for latching and securing a freely foldable saw blade body in its use position can be produced and assembled very easily with a minimum number of components on the basis of an idea completely different from the conventional ideas and that can exert a favorable latching effect.

Solution to Problem

To accomplish the above object, a foldable saw according to the present invention has a first feature that it is a foldable saw including at least a saw handle body, a saw blade body pivotally supported in a freely foldable and retractable manner with respect to the saw handle body and configured to be latched and locked in a use position, and a latch body attached to the saw handle body and configured to latch and lock the saw blade body, wherein the latch body is made of single spring wire and includes at least a coil section wound into a coil form, a stop pin section configured to extend from the coil section for pinning the coil section, a latch section configured to extend frontward from the coil section so as to be positioned in front of the coil section, and an operation section configured to extend rearward from the latch section so as to be positioned in rear of the coil section, the saw blade body includes at least a latch groove to which the latch body is to be latched, and the saw handle body includes at least a seating recess for the coil section of the latch body to be seated therein, a pin hole for the stop pin section of the latch body to be inserted and locked therein, and a receiving groove for the latch section of the latch body and the latch groove of the saw blade body to be received therein, and wherein the latch body is configured, in the state of being attached to the saw handle body, such that the latch section is spring-biased to enter into the receiving groove of the saw handle body, and that the latch section is responsive to an operation of the operation section to retreat against the spring bias.

Further, the foldable saw according to the present invention has, in addition to the first feature described above, a second feature that the coil section of the latch body is placed in the seating recess of the saw handle body in a state where an axial center of the coil section is orthogonal to front and back faces of the saw handle body, the stop pin section of the latch body is configured to extend from an end of the coil section, the latch section of the latch body is configured to extend frontward from another end of the coil section so as to be positioned in front of the coil section, the operation section is configured to extend continuously from the latch section rearward so as to be positioned in rear of the coil section, and the latch section and the operation section extending frontward and rearward, respectively, are configured to move up and down alternately with a branch line section as a fulcrum, the branch line section traversing on around a top of the coil section in an axial direction thereof.

Further, the foldable saw according to the present invention has, in addition to the second feature described above, a third feature that the operation section of the latch body is arranged unattached above a top face of the saw handle body and configured, when pressed downward, to raise the latch section with the branch line section of the latch body as the fulcrum.

Further, the foldable saw according to the present invention has, in addition to any one of the first through third features described above, a fourth feature that the coil section of the latch body seated in the seating recess of the saw handle body is retained in the seating recess, with a movable distance of the coil section being limited by the stop pin section locked in the pin hole of the saw handle body and the latch section spring-biased into the receiving groove of the saw handle body.

Further, the foldable saw according to the present invention has, in addition to any one of the first through fourth features described above, a fifth feature that the pin hole of the saw handle body for locking the stop pin section of the latch body is arranged in a position lower in level than a position of a bottom of the seating recess to prevent the coil section of the latch body from coming off upward from the seating recess.

Further, the foldable saw according to the present invention has, in addition to any one of the first through fifth features described above, a sixth feature that the latch section of the latch body spring-biased and held in the state of being received in the receiving groove of the saw handle body is configured such that, when the coil section is about to move in a direction coming off from the seating recess of the saw handle body, the latch section abuts against an inner wall of the receiving groove of the saw handle body to prevent the movement of the coil section.

Further, the foldable saw according to the present invention has, in addition to any one of the first through sixth features described above, a seventh feature that the seating recess of the saw handle body has an open end slightly reduced in diameter.

Advantageous Effects of Invention

According to the foldable saw having the first feature described above, the latch body is made of a piece of spring wire.

The latch body is attached to the saw handle body with its stop pin section inserted and locked in the pin hole of the saw handle body, its coil section seated in the seating recess of the saw handle body, and its latch section caused to enter into the receiving groove of the saw handle body.

The saw blade body, when turned to the use position, is latched and locked by the latch section of the latch body in the receiving groove of the saw handle body. On the other hand, when the operation section of the latch body is operated, the latch section retreats, so the latch is released and the saw blade body is unlocked.

The latch body can be made, using a piece of spring wire, by bending the wire to form the coil section, the stop pin section, the latch section, and the operation section. It can be produced without complicated processing or multiple process steps.

The latch body can be attached to the saw handle body by seating the coil section in the seating recess of the saw handle body, inserting and locking the stop pin section in the pin hole of the saw handle body, and spring-biasing the latch section to cause it to enter the receiving groove of the saw handle body, without the need of other components.

That is to say, according to the foldable saw having the first feature of the present invention, it is possible to provide a foldable saw that can be produced and assembled very easily with a minimum number of components and that can exert a favorable latching effect.

According to the foldable saw having the second feature described above, in addition to the functions and effects obtained by the first feature, the coil section of the latch body is placed in the seating recess of the saw handle body in the state where the axial center of the coil section is orthogonal to the front and back faces of the saw handle body. The stop pin section of the latch body is configured to extend from an end of the coil section. Further, the latch section, which extends frontward from the other end of the coil section, and the operation section, which further extends continuously from the latch section toward the rear of the coil section, are configured to move up and down alternately with the branch line section as a fulcrum, the branch line section axially traversing on around the top of the coil section whose axial center is orthogonal to the front and back faces of the saw handle body.

Thus, the latch body can readily be formed by bending a piece of spring wire, by forming the stop pin section on one end of the coil section and forming the latch section and then the operation section on the other end of the coil section.

Further, operating the operation section of the latch body enables the latch section to turn against the spring bias, with the branch line section traversing on around the top of the coil section serving as the fulcrum.

Further, according to the foldable saw having the third feature described above, in addition to the functions and effects obtained by the second feature, the operation section of the latch body is arranged unattached above the top face of the saw handle body and, when pressed downward, raises the latch section with the branch line section of the latch body as the fulcrum. With this configuration, the latch section can be raised easily by simply depressing the operation section, thereby ensuring good operability of the foldable saw.

Further, according to the foldable saw having the fourth feature described above, in addition to the functions and effects obtained by any one of the first through third features, the coil section of the latch body seated in the seating recess of the saw handle body is retained in the seating recess with its movable distance limited by the stop pin section locked in the pin hole of the saw handle body and the latch section spring-biased into the receiving groove of the saw handle body. This makes it possible to effectively prevent the coil section from coming off from the seating recess with such a simple structure.

Further, according to the foldable saw having the fifth feature described above, in addition to the functions and effects obtained by any one of the first through fourth features, the pin hole of the saw handle body to which the stop pin section of the latch body is to be locked is arranged in a position lower in level than the position of the bottom of the seating recess, to thereby prevent the coil section of the latch body from coming off upward from the seating recess. This makes it possible to effectively prevent the coil section from coming off upward from the seating recess with such a simple structure.

Further, according to the foldable saw having the sixth feature described above, in addition to the functions and effects obtained by any one of the first through fifth features, the latch section of the latch body spring-biased and held in the state of being received in the receiving groove of the saw handle body is configured such that, when the coil section is about to move in the direction coming off from the seating recess of the saw handle body, the latch section abuts against the inner wall of the receiving groove of the saw handle body, thereby preventing the movement of the coil section. This makes it possible to effectively prevent the coil section from coming off from the seating recess.

Further, according to the foldable saw having the seventh feature described above, in addition to the functions and effects obtained by any one of the first through sixth features the seating recess of the saw handle body has its open and slightly reduced in diameter. This makes it possible to effectively prevent the coil section from coming off upward from the seating recess with such a simple structure.

BRIEF DESCRIPTION OF DRAWINGS

FIG. 2 shows the foldable saw according to the embodiment of the present invention, where (a) is an overall view with the saw blade body in the retracted state, and (b) shows the main part in (a).

FIG. 3 shows, in perspective view, the main part of the foldable saw according to the embodiment of the present invention, where (a) shows the state where the saw blade body is retracted, and (b) shows the state where the saw blade body is locked in its use position.

FIG. 4 shows the main part of the foldable saw according to the embodiment of the present invention, where (a) is an exploded perspective view, and (b) is a plan view of a latch body.

FIG. 5 schematically shows how a force is applied in response to operation of an operation section of the foldable saw according to the embodiment of the present invention, where (a) is a side view of the main part of the foldable saw, and (b) shows the latch body as seen from the rear.

FIG. 6 shows modifications to the foldable saw according to the embodiment of the present invention, where (a) shows a main part of a first modification, and (b) shows a main part of a second modification.

DESCRIPTION OF EMBODIMENT

A foldable saw according to an embodiment of the present invention will be described below with reference to the drawings for understanding of the present invention. The following description however is not intended to limit the present invention recited in the claims.

Referring first to FIGS. 1 to 5, a foldable saw 1 according to an embodiment of the present invention is a saw that has a saw blade body 30 pivotally supported in a freely foldable manner with respect to a saw handle body 20 via a tie bolt 40 and a spring washer 50. This foldable saw 1 is composed of a latch body 10, the saw handle body 20, and the saw blade body 30.

The latch body 10 is a member for securing the saw blade body 30 in the use position at the time of use of the foldable saw 1 and for releasing the saw blade body 30 from its use position after the use of the foldable saw 1. This latch body 10 is configured with a piece of spring wire (spring member) composed of a coil section 11, a stop pin section 12, a latch section 13, a branch line section 14, and an operation section 15.

For the spring wire, piano wire or any other wire capable of exerting spring bias as the latch body 10 can be used.

The coil section 11 serves as a biasing force generating section for generating a biasing force in the spring wire, and also serves as a seated section when the latch body 10 is attached to the saw handle body 20. In the present embodiment, the coil section 11 used is of a cylindrical shape formed by winding the spring wire several times into a coil form, and it is seated in the state where an axial center J of the coil section 11 (see FIG. 4(b)) is aligned with a thickness direction of the saw handle body 20 (direction orthogonal to a front face 26 and a back face 27 of the saw handle body 20).

The coil section 11 has a width in the axial center J direction approximately the same as the thickness of the saw handle body 20 in its portion where the coil section 11 is seated. Specifically, when the thickness of the saw handle body 20 in the portion where the coil section 11 is seated is 10 mm, the width in the axial center J direction of the coil section 11 is also approximately 10 mm. When spring wire having a diameter of 2 mm is used as the above-described spring wire, the wire is wound about five times to form the coil section 11.

Figure 4:
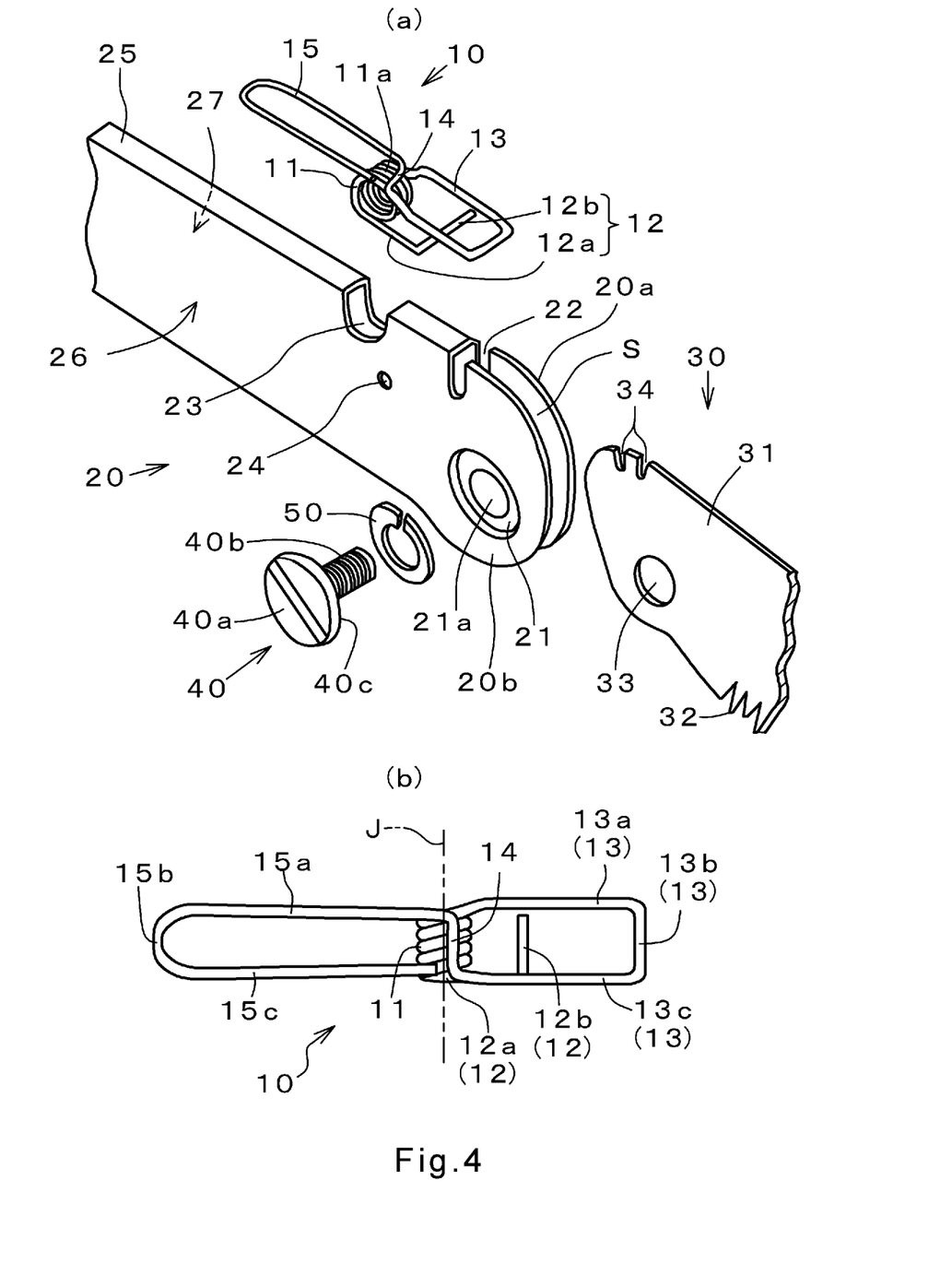

The stop pin section 12 serves as an attachment for attaching the latch body 10 to the saw handle body 20. In the present embodiment, as shown in FIG. 4, the stop pin section 12 is made up of: a pin arm 12a, which extends continuously from a bottom of a coil end, constituting an end of the seated coil section 11, in a tangent direction of the coil toward the front in the longitudinal direction of the saw handle body 20; and a pin shaft 12b, which is formed by bending a tip end of the pin arm 12a in the direction orthogonal to the front and back faces of the saw handle body 20.

The pin shaft 12b of the stop pin section 12 is inserted and locked in a pin hole 24 (described later) provided at the saw handle body 20.

The latch section 13 is configured to be spring-biased, via a biasing force of the spring member, and held in a state of being received in a latch groove 34 (described later) provided at the saw blade body 30, and engaged with the latch groove 34 for securing the saw blade body 30 in an immobile state in its use position. In the present embodiment, this latch section 13 is formed with a part of the spring wire of an approximately U shape.

More specifically, the latch section 13 is made up of: a first side arm 13a, which is formed by extending the spring wire from a top 11a of the coil section 11, from a coil end constituting the other end of the coil section 11, in the tangent direction of the coil toward the front in the longitudinal direction of the saw handle body 20; a head 13b, which is formed continuously from the first side arm 13a by bending the wire in the direction orthogonal to the front and back faces of the saw handle body 10; and a second side arm 13c, which is formed continuously from the head 13b by bending the wire by approximately 90 degrees toward the rear in the longitudinal direction of the saw handle body 20 and causing it to extend to the coil section 11.

The first side arm 13a and the second side arm 13c are arranged to have a gap therebetween that is slightly greater than the thickness of the saw handle body 20 in the corresponding position, so as to prevent the side arms 13a, 13c from contacting the saw handle body 20 and also ensure that the head 13b extends across and is reliably caught by the latch groove 34 of the saw handle body 20.

It should be noted that "front" and "rear" as used herein refer respectively to the direction toward the front and of the saw handle body 20 where the saw blade body 30 is pivotally supported in a freely rotatable manner, and the direction toward the tail end of the saw handle body 20 where no saw blade body 30 is attached.

The branch line section 14 provides connection between the latch section 13, disposed in front of the coil section 11, and the operation section 15, disposed in the rear of the coil section 11. The branch line section 14 also constitutes a fulcrum when the operation section 15 is operated.

Figure 2:
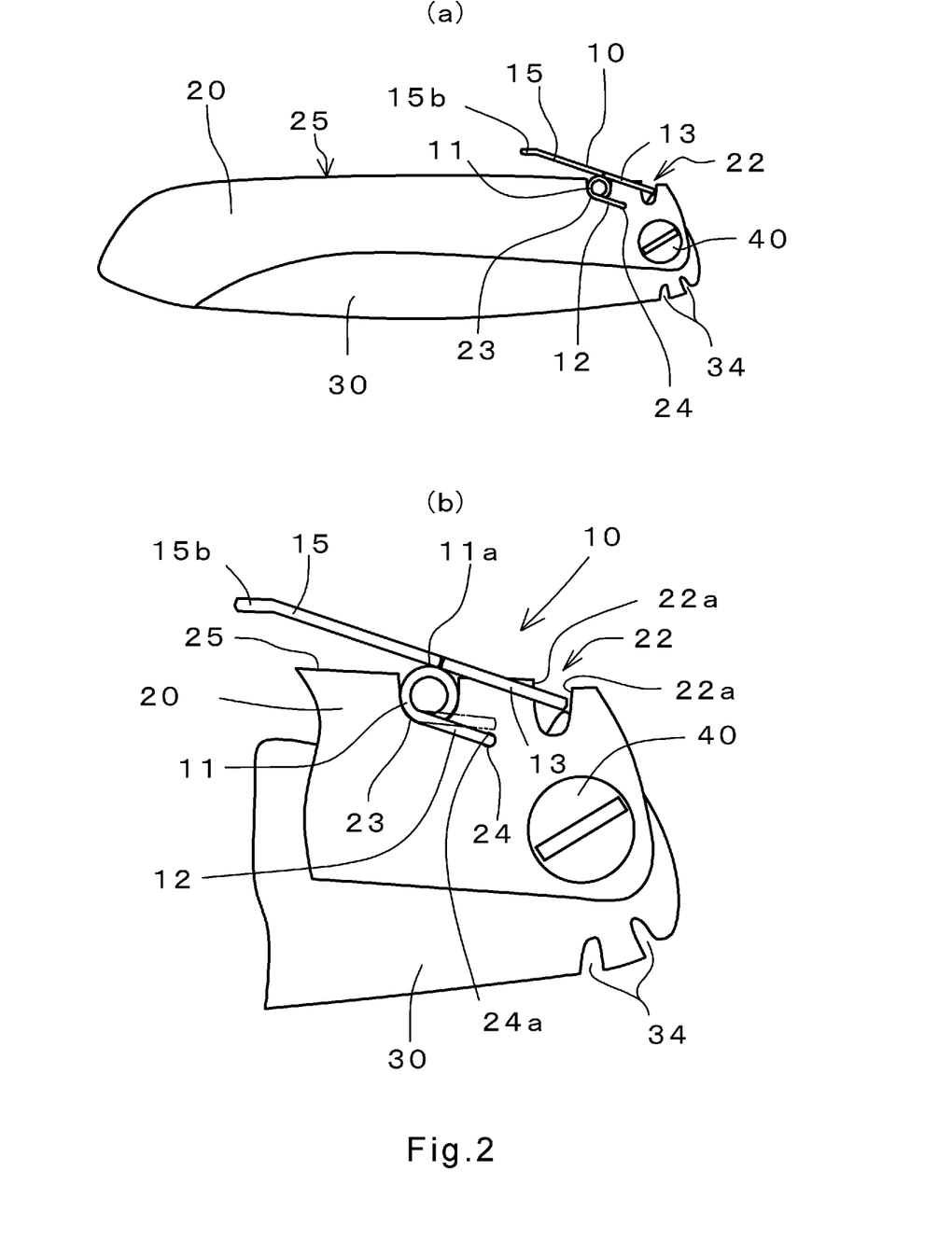
Figure 3:
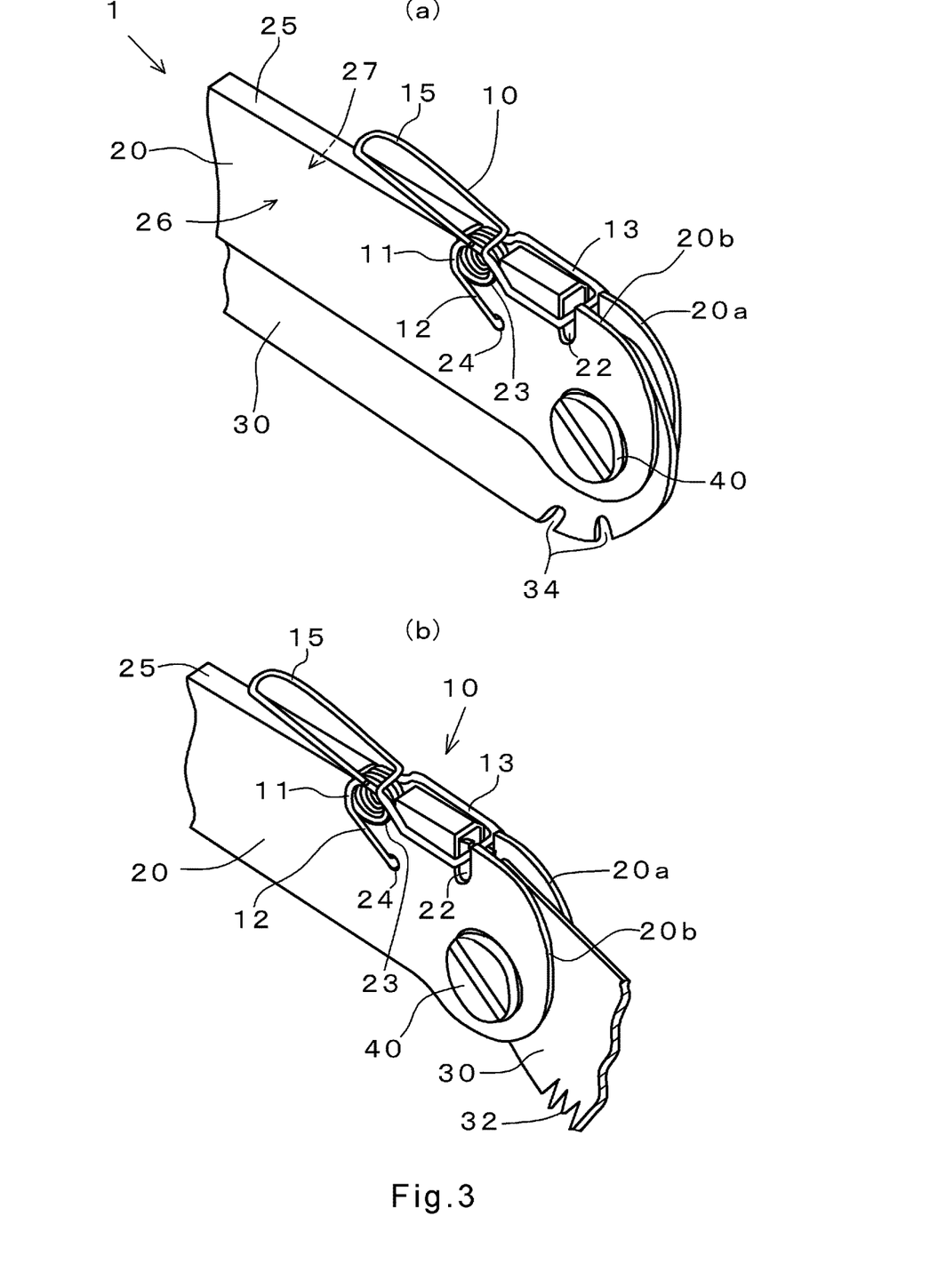

In the present embodiment, as shown in FIGS. 2 to 4, the branch line section 14 is formed continuously from the second side arm 13c of the latch section 13 by bending the spring wire by approximately 90 degrees toward the interior in the thickness direction of the saw handle body 20, and causing the wire to extend from one end to the other end in the axial center J direction of the coil section 11. Further, as shown in FIGS. 2(b) and 4, the branch line section 14 is arranged so that it axially traverses on around the top 11a of the coil section 11. More specifically, the branch line section 14 is caused to extend in parallel with the axial center J of the coil section 11, which is indicated by the two-dot-dashed line in FIG. 4(b). With this configuration, the latch section 13 and the operation section 15 can be moved up and down alternately with the branch line section 14 serving as the fulcrum.

It should be noted that, here, "on around the top 11a" refers to the position where the branch line section 14 does not necessarily have to be always in contact with the top 11a, but at least in response to the operation section 15 pressed downward, the branch line section 14 abuts against the top 11a of the coil section 11, or against the coil section 11 in the vicinity of the top 11a, so that the branch line section 14 can function as the fulcrum.

The operation section 15 constitutes an operation piece that is operated when releasing the saw blade body 30 from the use state. In the present embodiment, as shown in FIG. 4(b), the operation section 15 is formed with a part of the spring wire of an approximately U shape, which is disposed on one side of the branch line section 14 in the longitudinal direction of the saw handle body 20 opposite to the side of the latch section 13.

Specifically, the operation section 15 is made up of: a first lateral side 15a, which is formed continuously from the branch line section 14 by causing the spring wire to extend toward the side (rearward) opposite to the latch section 13 in the longitudinal direction of the saw handle body 20; a tail end side 15b, which is formed continuously from the first lateral side 15a by bending the wire by approximately 90 degrees toward the interior in the thickness direction of the saw handle body 20; and a second lateral side 15c, which is formed continuously from the tail end side 15b by bending the wire toward the front in the longitudinal direction of the saw handle body 20 and causing it to extend to the coil section 11.

Further, in the present embodiment, as shown in FIGS. 2 and 3, the operation section 15 is arranged in such a manner that in normal times it is slanted obliquely upward toward the rear in the longitudinal direction of the saw handle body 20. Further, the operation section 15 has its rear portion slightly bent to become approximately parallel to a top face 25 of the saw handle body 20 so as to ease the operator's pressing operation.

In this manner, the operation section 15 is arranged unattached above the top face 25 of the saw handle body 20, and the operation section 15, when pressed downward, raises the latch section 13 with the branch line section 14 as a fulcrum.

While the operation section 15 has its rear portion bent to become approximately parallel to the top face 25 of the saw handle body 20, such a configuration is advantageous in that the operator can readily hook that operation section 15 on his/her waist belt. This also makes the foldable saw very convenient for the operator to carry around when not in use.

Further, as seen in plan view in FIG. 4(b), the latch body 10 is formed to have a shape of approximately the figure eight by the latch section 13, the branch line section 14, and the operation section 15 with the coil section 11 at the center, as the latch section 13 and the operation section 15, separated by the branch line section 14, extend frontward and rearward, respectively, from the top 11a of the coil section 11.

Such a latch body 10 can be formed using a piece of spring wire, as if drawn unicursally, through sequential bending of the spring wire from one end to the other end.

Referring to FIGS. 3 and 4(a) as well, the saw handle body 20 serves as a grip of the foldable saw 1, and also pivotally supports the saw blade body 30 in a freely foldable manner via the tie bolt 40 and the spring washer 50.

In the present embodiment, the saw handle body 20 is made of a metal plate, which is bent in an inverted U shape to form a pair of bent pieces 20a, 20b with the top face 25 therebetween. The saw blade body 30 is configured to be folded and retracted into a space S between the pair of bent pieces 20a, 20b.

In a front portion of the saw handle body 20, the top face 25 is cut out to expose the space S between the pair of bent pieces 20a, 20b, so as not to obstruct the turning of the saw blade body 30 at around its base.

The opposing bent pieces 20a, 20b have circular depressions 21, 21 formed to oppose each other. With these depressions, the space S is narrowed to the size close to the thickness of the saw blade body 30, thereby avoiding looseness of the saw blade body 30 when the same is pivotally supported in a freely rotatable manner.

For attaching the saw blade body 30, a through hole 33 provided at the saw blade body 30 is set between and aligned with through holes 21a, 21a provided at the pair of depressions 21, 21, and a shaft 40b of the tie bolt 40 is passed through the holes, via the spring washer 50, and screwed into a female screw provided at the through hole 21a on the back side (not shown).

It should be noted that the tie bolt 40 cooperates with the spring washer 50 for firmly clamping and securing the saw blade body 30 to the saw handle body 20 or for releasing and separating the saw blade body 30 from the saw handle body 20. The tie bolt 40 is made up of a head 40a, having a bearing surface 40c facing the outer surface of the bent piece 20b, and the screw shaft 40b.

The spring washer 50 is primarily for preventing loosening of the tie bolt 40 due to vibration or the like.

The saw handle body 20 is provided with a receiving groove 22. This receiving groove 22 is a groove for receiving the latch groove 34 which is provided on the upper side of the base of the saw blade body 30. The receiving groove 22 is also a groove for latching the head 13b of the latch section 13 of the latch body 10 therein.

The receiving groove 22 is arranged on the top face 25 at the front portion of the saw handle body 20. In the portion ahead of this receiving groove 22, the top face 25 is cut out to expose the above-described space S. With this, the portion of the saw blade body 30 at around its base is turned with no problem, so that the latch groove 34 of the saw blade body 30 is received in the receiving groove 22 with no problem.

Meanwhile, the saw handle body 20 has a seating recess 23 provided behind the receiving groove 20. This seating recess 23 is a recessed portion for the coil section 11 of the latch body 10 to be seated.

Further, a pin hole 24 is provided to penetrate at a position between the receiving groove 22 and the seating recess 23, at a level lower than the bottom of the receiving groove 22 and the bottom of the seating recess 23. This pin hole 24 is a hole for the pin shaft 12b at the tip end of the stop pin section 12 of the latch body 10 to be inserted for locking.

As explained above, the coil section 11 of the latch body 10 is seated in the seating recess 23 of the saw handle body 20. The seating is made in such a manner that the axial center J of the coil section 11 extends in the direction orthogonal to the front face 26 and the back face 27 of the saw handle body 20.

The seating recess 23 may be formed to have a bottom shape similar or identical to the shape of the lower half of the coil section 11 so as to be able to receive the lower half of the coil section 11 just right. The seating recess 23 as a whole may be of a U or approximately U shape.

The seating recess 23 may have a depth corresponding to the winding diameter of the coil section 11. However, the depth is preferably determined such that, in the seated state, the top 11a of the coil section 11 protrudes slightly from the seating recess 23. In this case, the top 11a of the coil section 11 is made to protrude from the seating recess 23 by the size equal to or greater than the diameter of the spring wire constituting the latch body 10 but not greater than the double of that diameter.

The reasons why the top 11a of the coil section 11 is made to slightly protrude from the seating recess 23 are: to prevent the latch section 13 extended from the top 11a of the coil section 11 in the tangent direction of the coil from readily contacting the saw handle body 20; to secure a sufficient range within which the operation section 15 can be depressed; and to secure a sufficient range within which the latch section 13 can be raised in response to depression of the operation section 15 so that the latch section 13 is reliably disengaged from the latch groove 34 of the saw blade body 30.

Further, in the present embodiment, the coil section 11 of the latch body 10 seated in the seating recess 23 of the saw handle body 20 is retained in the seating recess 23, with the movable distance of the coil section being limited by the stop pin section 12 locked in the pin hole 24 and the latch section 13 spring-biased into the receiving groove 22 of the saw handle body 20.

Specifically, the pin arm 12a of the stop pin section 12 of the latch body 10 is configured to have a length that is shorter than the distance from the pin hole 24 of the saw handle body 20 to the upper edge (on the shorter distance side) of the seating recess 23. This prevents the coil section 11 from coming off from the seating recess 23 even if the coil section 11 is about to exit upward from the seating recess 23 with the pin hole 24 as the rotational axis. In addition, the first and second side arms 13a, 13c of the latch section 13 are configured to have a length ensuring that, when the head 13b in the state of being received in the receiving groove 22 is moved only slightly forward, the head 13b abuts against an inner wall 22a of the receiving groove 22 (see FIG. 2(b)) and gets stuck. With this, even if the coil section 11 is about to come off upward from the seating recess 23 with the pin hole 24 as the rotational axis, the latch section 13 gets stuck, preventing the coil section 11 from coming off.

Further, the movement or dropping of the coil section 11 in the lateral direction (thickness direction) of the saw handle body 20 is restricted as the stop pin section 12 locked in the pin hole 24 abuts against the front face 26 of the saw handle body 20, and also as the first and second side arms 13a, 13c of the latch section 13, spring-biased into the receiving groove 22, abut against the front face 26 or the back face 27 of the saw handle body 20.

The saw blade body 30 is made of metal, and has a saw blade section 32 with a plurality of sharp points on a side edge of a saw body section 31. Further, as shown in FIG. 4(a), the saw blade body 30 has its base provided with a through hole 33 into which the tie bolt 40 is inserted. Further, on an upper side of the base of the saw blade body 30, a latch groove 34 is provided which can be engaged with and disengaged from the latch section 13 of the latch body 10. In the present embodiment, two such latch grooves 34 are provided to allow the angle of the saw blade body 30 in its use position to be adjusted in two steps.

Referring to FIGS. 3 and 4, for securing the saw blade body 30 to the saw handle body 20, the saw blade body 30 is inserted into the space S in such a manner that the through hole 33 of the saw blade body 30 is aligned with the through holes 21a of the saw handle body 20. Next, with the spring washer 50 passed through the shaft 40b, the tie bolt 40 is screwed onto the saw handle body 20. With this, the saw blade body 30 is secured to the saw handle body 20.

For attaching the latch body 10 to the saw handle body 20, the pin shaft 12b of the stop pin section 12 of the latch body 10 is inserted into the pin hole 24 of the saw handle body 20 from a side of the saw handle body 20. At the same time, the coil section 11 is inserted into the seating recess 23 from the side of the saw handle body 20 to be seated therein. At this time, referring to FIG. 2(b), the latch body 10 is attached to the saw handle body 20 in such a manner that the gap distance between the stop pin section 12 and the latch section 13 is increased (widened) after the latch body 10 is attached to the saw handle body 20, as shown by the solid line in FIG. 2(b), as compared to that before the latch body 10 is attached to the saw handle body 20 (i.e. when the latch body 10 is in a disengaged state), shown by the two-dot-dashed line. With this, the head 13b of the latch section 13 is spring-biased to enter into the receiving groove 22. The pin hole 24 is positioned in advance to allow such spring bias to occur.

In the above-described manner, the latch body 10 is attached to the saw handle body 20.

When the foldable saw 1 having the above-described structure is put into use, the saw blade body 30 is turned from the folded position to the use position, as schematically shown in FIG. 3. Along with the turn, the edge of the base of the saw blade body 30 presses the head 13b of the latch section 13 of the latch body 10, located in the receiving groove 22 of the saw handle body 20, upward against the biasing force. As the latch groove 34 of the saw blade body 30 enters into the receiving groove 22 of the saw handle body 20, the head 13b of the latch section 13 is caught by the latch groove 34, thereby establishing latching engagement. With this, the saw blade body 30 is secured in a position where it is ready to cut an object, as shown in FIG. 1.

Figure 1:
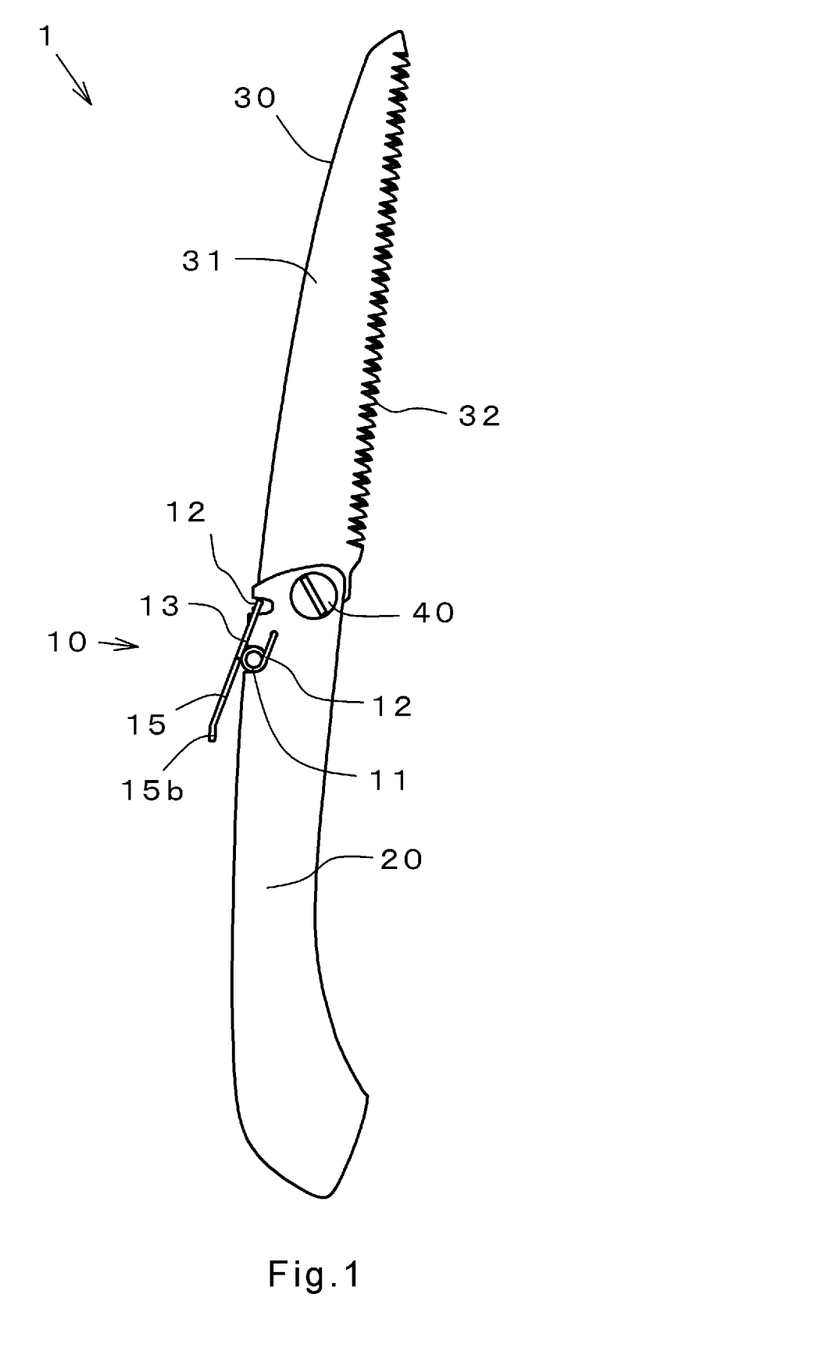
FIG. 1 is an overall view of a foldable saw according to an embodiment of the present invention, with a saw blade body locked in its use position.
Figure 5:
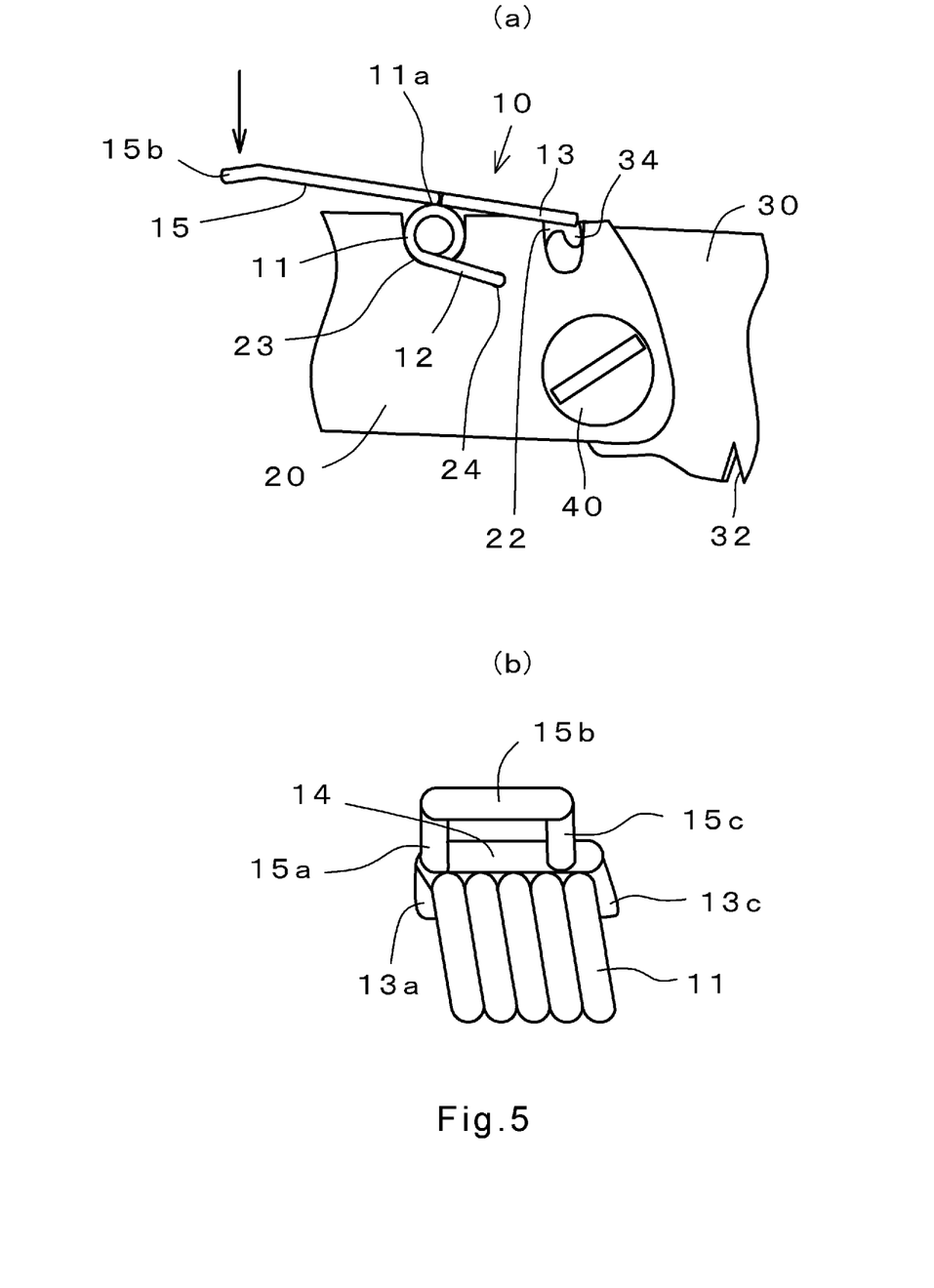

Further, from the latched state as shown in FIG. 1, when the operation section 15 is depressed with the finger (see FIG. 5), the latch section 13 moves upward against the spring bias, with the branch line section 14 as a fulcrum. In this state, when the saw blade body 30 is lifted up and the pressing of the operation section 15 is released in the position where the latch section 13 is to be engaged with another latch groove 34 at the base of the saw blade body 30, the latch section 13 and the other latch groove 34 at the base of the saw blade body 30 are engaged, thereby allowing the angle of the saw blade body 30 to be changed.

For folding the saw, the operation section 15 (the tail end side 15b) is pressed downward with the finger to cause the latch section 13 to move up against the spring bias with the branch line section 14 as the fulcrum. This allows the latch section 13 to be disengaged from the latch groove 34 against the spring bias. That is to say, the latch section 13 retreats in the release direction from the receiving groove 22 against the spring bias. Then, in this state, the saw blade body 30 can be moved in the folding direction, so that the saw blade body 30 is retracted in the saw handle body 20.

The foldable saw 1 according to the present embodiment having the above-described structure exerts the following effects.

The latch body 10 having the coil section 11, the stop pin section 12, the latch section 13, the branch line section 14, and the operation section 15 is formed with a piece of spring wire. This reduces the number of components of the so-called securing member for securing the saw blade body 30 in its use position. It is thus possible to provide a foldable saw that enables cost savings and also ensures good production efficiency.

The latch body 10 can be attached to the saw handle body 20 by simply inserting the pin shaft 12b of the stop pin section 12 into the pin hole 24 from a side of the saw handle body 20 for locking and also causing the coil section 11 to be seated in the seating recess 23 from the side of the saw handle body 20. No additional member is required for attaching the latch body 10 to the saw handle body 20.

In other words, the foldable saw 1 can be formed with the latch body 10, the saw handle body 20, and the saw blade body 30, together with the tie bolt 40 and the spring washer 50 alone. Accordingly, the number of components of the foldable saw 1 as a whole can be reduced. It is thus possible to provide a foldable saw that enables cost savings and also ensures good production efficiency.

Further, the coil section 11 of the latch body 10 is arranged in the seating recess 23 of the saw handle body 20 such that the axial center J of the coil section 11 extends in the direction orthogonal to the front and back faces 26, 27 of the saw handle body 20. The latch section 13 and the operation section 15 extending frontward and rearward, respectively, are caused to move up and down alternately, with the branch line section 14 axially traversing on around the top 11a of the coil section 11 as a fulcrum. This facilitates moving the latch section 13 and the operation section 15 up and down alternately with the branch line section 14 as the fulcrum.

Furthermore, the branch line section 14 is caused to extend in parallel with the axial center J of the coil section 11 indicated by the two-dot-dashed line in FIG. 4(b). This allows a uniform force to be applied to the branch line section 14 when the operation section 15 is pressed downward to release the latch section 13 from the receiving groove 22 against the spring bias.

Specifically, when operating the operation section 15, a force is applied in the arrow direction shown in FIG. 5(a), with the branch line section 14 serving as the fulcrum, the portion at around the tail end side 15b serving as the point of effort, and the latch section 13 serving as the point of load. The applied force is conveyed to the branch line section 14 which constitutes the fulcrum while contacting the coil section 11. Accordingly, as shown in FIGS. 4(b) and 5(b), uniform load can be applied from the operation section 15 to the latch section 13 efficiently via the linear branch line section 14 extending in parallel with the axial center J. It is thus possible to provide a foldable saw ensuring good operability.

Further, the coil section 11 of the latch body 10 seated in the seating recess 23 of the saw handle body 20 is retained in the seating recess 23, with the movable distance of the coil section being limited by the stop pin section 12 locked in the pin hole 24 and the latch section 13 spring-biased into the receiving groove 22 of the saw handle body 20. This makes it possible to effectively prevent the coil section 11 from coming off from the seating recess 23 with such a simple structure. It is thus possible to provide a foldable saw ensuring high safety.

Further, when the coil section 11 is about to move in the direction coming off from the seating recess 23, the latch section 13 spring-biased and held in the state of being received in the receiving groove 22 of the saw handle body 20 abuts against the inner wall 22a of the receiving groove 22 of the saw handle body 20, thereby preventing the movement of the coil section 11. This makes it possible to further effectively prevent the coil section 11 from coming off from the seating recess 23. It is thus possible to provide a foldable saw ensuring higher safety.

Furthermore, the pin hole 24 of the saw handle body 20 for locking the stop pin section 12 of the latch body 10 is placed in a position lower in level than the bottom of the seating recess 23 and the bottom of the receiving groove 22. This makes it possible to effectively prevent the coil section 11 from coming off upward from the seating recess 23 with such a simple structure. It is thus possible to provide a foldable saw ensuring higher safety.

Further, the operation section 15 is arranged unattached above the top face 25 of the saw handle body 20, and the operation section 15, when pressed downward, raises the latch section 13 with the branch line section 14 as a fulcrum. This makes it possible to readily raise the latch section 13 by simply depressing the operation section 15. It is thus possible to provide a foldable saw ensuring good operability.

Further, the operation section 15 has its rear portion slightly bent to become approximately parallel to the top face 25 of the saw handle body 20. With this, even when an operator holds the saw handle body 20 with one hand, the operator can readily put his/her thumb on the operation section 15 and press it downward with ease. It is thus possible to provide a foldable saw ensuring better operability.

Figure 6:
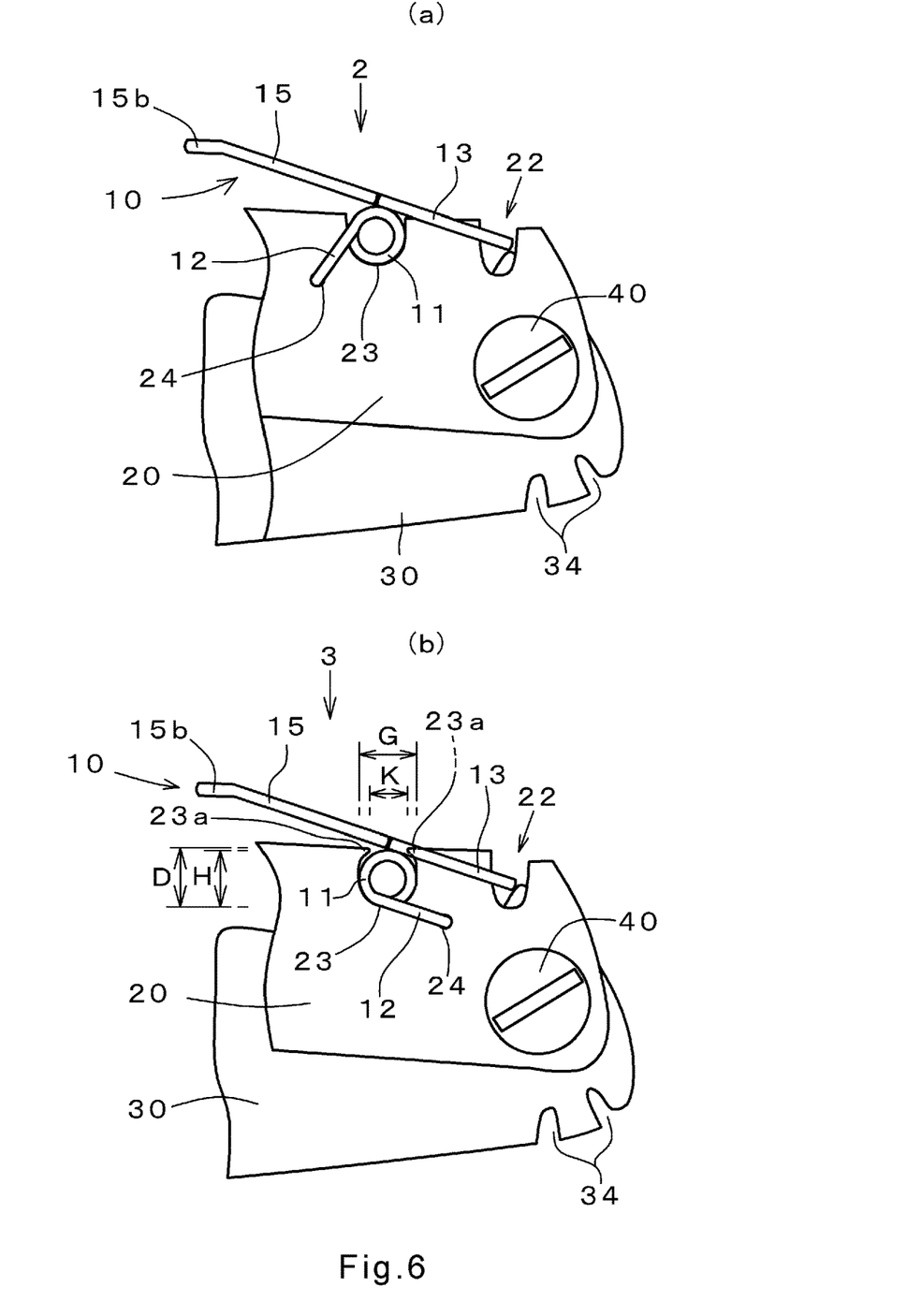

Next, referring to FIG. 6, modifications to the foldable saw 1 according to the embodiment of the present invention will be described.

Firstly, a first modification to the foldable saw 1 according to the embodiment of the present invention will be described with reference to FIG. 6(a).

The first modification is a modification to the above-described foldable saw 1 according to the embodiment of the present invention, and differs only in the direction in which the stop pin section 12 of the latch body 10 extends from the coil section 11 and the position where the pin hole 24 of the saw handle body 20 is formed. The remaining configuration is identical to that of the above-described foldable saw 1 according to the embodiment of the present invention. Therefore, the same members or those exerting the same functions as in the above-described foldable saw 1 of the embodiment of the present invention are denoted by the same reference numerals, and the detailed description thereof will not be repeated.

The foldable saw 2 according to the first modification has a stop pin section 12 that is formed continuously from an end of the coil section 11 by causing the spring wire to extend diagonally rearward in the longitudinal direction of the saw handle body 20.

Further, in keeping with the configuration of the stop pin section 12, a pin hole 24 is provided in the rear of the receiving groove 22 and the seating recess 23, in a position lower in level than the receiving groove 22 and the seating recess 23.

With this configuration, even in the case where a force is applied in the direction in which the coil section 11 comes off from the seating recess 23, especially in the frontward direction of the saw handle body 20 relative to the seating recess 23, the stop pin section 12 inserted and locked in the pin hole 24 can effectively prevent the coil section 11 from coming off from the seating recess 23. It is thus possible to provide a foldable saw ensuring higher safety.

A second modification to the foldable saw according to the embodiment of the present invention will now be described with reference to FIG. 6(b).

The second modification is a modification to the above-described foldable saw 1 according to the embodiment of the present invention, and differs only in the configuration of the seating recess 23 of the saw handle body 20 for receiving the coil section 11 of the latch body 10. The remaining configuration is identical to that of the above-described foldable saw 1 according to the embodiment of the present invention. Therefore, the same members or those exerting the same functions as in the above-described foldable saw 1 are denoted by the same reference numerals, and the detailed description thereof will not be repeated.

In the foldable saw 3 according to the second modification, the seating recess 23 has a depth D equal to or greater than a height H of the coil section 11, and the open end of the notch of the seating recess 23 is slightly reduced in diameter. More specifically, the open end of the notch has a pair of inwardly protruding pieces 23a that protrude toward the inside of the seating recess 23 of the saw handle body 20.

Further, a distance K between the pair of inwardly protruding pieces 23a is made shorter than an outer diameter G of the coil section 11.

With this configuration, even in the case where a force is applied in the direction in which the coil section 11 comes off from the seating recess 23, the pair of inwardly protruding pieces 23a reliably prevent the coil section 11 from coming off from the seating recess 23. It is thus possible to provide a foldable saw ensuring even higher safety.

It should be noted that the shapes, sizes, and positions of the receiving groove 22, the seating recess 23, and the pin hole 24, as well as the direction in which the stop pin section 12 extends in the latch body 10, are not limited to those described in the embodiment of the present invention; they can be changed as appropriate. However, it is necessary that in the state where the latch body 10 is attached to the saw handle body 20, the latch section 13 is spring-biased and held in the state of being received in the receiving groove 22.

Furthermore, the shapes and sizes of the latch section 13 and the operation section 15 are not limited to those described in the present embodiment; they can also be changed as appropriate.

INDUSTRIAL APPLICABILITY

The foldable saw according to the present invention has an industrial application in the field of foldable saws, as it can reduce the number of components, thereby enabling cost savings as well as promotion of the efficiency of the production process.

REFERENCE SIGNS LIST 1 foldable saw
2 foldable saw
3 foldable saw
10 latch body
11 coil section
11a top
12 stop pin section
12a pin arm
12b pin shaft
13 latch section
13a first side arm
13b head
13c second side arm
14 branch line section
15 operation section
15a first lateral side
15b tail end side
15c second lateral side
20 saw handle body
20a bent piece
20b bent piece
21 depression
21a through hole
22 receiving groove
22a inner wall
23 seating recess
23a inwardly protruding piece
24 pin hole
24a inner wall
25 top face
26 front face
27 back face
30 saw blade body
31 saw body section
32 saw blade section
33 through hole
34 latch groove
40 tie bolt
40a head
40b shaft
40c bearing surface
50 spring washer
D depth
G outer diameter
H height
J axial center
K distance
S space

What is claimed is:

1. A foldable saw including at least a saw handle body, a saw blade body pivotally supported in a freely foldable and retractable manner with respect to the saw handle body and configured to be latched and locked in a use position, and a latch body attached to the saw handle body and configured to latch and lock the saw blade body, wherein the latch body is made of single spring wire and comprises at least a coil section wound into a coil form, a stop pin section configured to extend from the coil section for pinning the coil section, a latch section configured to extend frontward from the coil section so as to be positioned in front of the coil section, and an operation section configured to extend rearward from the latch section so as to be positioned in rear of the coil section, the saw blade body comprises at least a latch groove to which the latch body is to be latched, and the saw handle body comprises at least a seating recess for the coil section of the latch body to be seated therein, a pin hole for the stop pin section of the latch body to be inserted and locked therein, and a receiving groove for the latch section of the latch body and the latch groove of the saw blade body to be received therein, and wherein the latch body is configured, in the state of being attached to the saw handle body, such that the latch section is spring-biased to enter into the receiving groove of the saw handle body, and that the latch section is responsive to an operation of the operation section to retreat against the spring bias.

2. The foldable saw according to claim 1, wherein the coil section of the latch body is placed in the seating recess of the saw handle body in a state where an axial center of the coil section is orthogonal to front and back faces of the saw handle body, the stop pin section of the latch body is configured to extend from an end of the coil section, the latch section of the latch body is configured to extend frontward from another end of the coil section so as to be positioned in front of the coil section, the operation section is configured to extend continuously from the latch section rearward so as to be positioned in rear of the coil section, and the latch section and the operation section extending frontward and rearward, respectively, are configured to move up and down alternately with a branch line section as a fulcrum, the branch line section traversing on around a top of the coil section in an axial direction thereof.

3. The foldable saw according to claim 2, wherein the operation section of the latch body is arranged unattached above a top face of the saw handle body and configured, when pressed downward, to raise the latch section with the branch line section of the latch body as the fulcrum.

4. The foldable saw according to claim 1, wherein the coil section of the latch body seated in the seating recess of the saw handle body is retained in the seating recess, with a movable distance of the coil section being limited by the stop pin section locked in the pin hole of the saw handle body, and wherein the latch section is spring-biased into the receiving groove of the saw handle body.

5. The foldable saw according claim 1, wherein the pin hole of the saw handle body for locking the stop pin section of the latch body is arranged in a position lower in level than a position of a bottom of the seating recess to prevent the coil section of the latch body from coming off upward from the seating recess.

6. The foldable saw according to claim 1, wherein the latch section of the latch body spring-biased and held in the state of being received in the receiving groove of the saw handle body is configured such that, when the coil section is about to move in a direction coming off from the seating recess of the saw handle body, the latch section abuts against an inner wall of the receiving groove of the saw handle body to prevent the movement of the coil section.

7. The foldable saw according to claim 1, wherein the seating recess of the saw handle body has an open end slightly reduced in diameter.

8. The foldable saw according to claim 2, wherein the coil section of the latch body seated in the seating recess of the saw handle body is retained in the seating recess, with a movable distance of the coil section being limited by the stop pin section locked in the pin hole of the saw handle body, and wherein the latch section is spring-biased into the receiving groove of the saw handle body.

9. The foldable saw according to claim 3, wherein the coil section of the latch body seated in the seating recess of the saw handle body is retained in the seating recess, with a movable distance of the coil section being limited by the stop pin section locked in the pin hole of the saw handle body, and wherein the latch section is spring-biased into the receiving groove of the saw handle body.

10. The foldable saw according to claim 2, wherein the pin hole of the saw handle body for locking the stop pin section of the latch body is arranged in a position lower in level than a position of a bottom of the seating recess to prevent the coil section of the latch body from coming off upward from the seating recess.

11. The foldable saw according to claim 3, wherein the pin hole of the saw handle body for locking the stop pin section of the latch body is arranged in a position lower in level than a position of a bottom of the seating recess to prevent the coil section of the latch body from coming off upward from the seating recess.

12. The foldable saw according to claim 4, wherein the pin hole of the saw handle body for locking the stop pin section of the latch body is arranged in a position lower in level than a position of a bottom of the seating recess to prevent the coil section of the latch body from coming off upward from the seating recess.

13. The foldable saw according to claim 2, wherein the latch section of the latch body spring-biased and held in the state of being received in the receiving groove of the saw handle body is configured such that, when the coil section is about to move in a direction coming off from the seating recess of the saw handle body, the latch section abuts against an inner wall of the receiving groove of the saw handle body to prevent the movement of the coil section.

14. The foldable saw according to claim 3, wherein the latch section of the latch body spring-biased and held in the state of being received in the receiving groove of the saw handle body is configured such that, when the coil section is about to move in a direction coming off from the seating recess of the saw handle body, the latch section abuts against an inner wall of the receiving groove of the saw handle body to prevent the movement of the coil section.

15. The foldable saw according to claim 4, wherein the latch section of the latch body spring-biased and held in the state of being received in the receiving groove of the saw handle body is configured such that, when the coil section is about to move in a direction coming off from the seating recess of the saw handle body, the latch section abuts against an inner wall of the receiving groove of the saw handle body to prevent the movement of the coil section.

16. The foldable saw according to claim 5, wherein the latch section of the latch body spring-biased and held in the state of being received in the receiving groove of the saw handle body is configured such that, when the coil section is about to move in a direction coming off from the seating recess of the saw handle body, the latch section abuts against an inner wall of the receiving groove of the saw handle body to prevent the movement of the coil section.

17. The foldable saw according to claim 2, wherein the seating recess of the saw handle body has an open end slightly reduced in diameter.

18. The foldable saw according to claim 3, wherein the seating recess of the saw handle body has an open end slightly reduced in diameter.

19. The foldable saw according to claim 4, wherein the seating recess of the saw handle body has an open end slightly reduced in diameter.

20. The foldable saw according to claim 5, wherein the seating recess of the saw handle body has an open end slightly reduced in diameter.

* * * * *